United States Patent
Johnston (10) Patent No.: US 9,634,766 B2
(45) Date of Patent: Apr. 25, 2017

(54) DISTRIBUTED ACOUSTIC SENSING USING LOW PULSE REPETITION RATES

(71) Applicant: William Johnston, Blacksburg, VA (US)

(72) Inventor: William Johnston, Blacksburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 7 days.

(21) Appl. No.: 14/664,277

(22) Filed: Mar. 20, 2015

(65) Prior Publication Data

US 2015/0318920 A1   Nov. 5, 2015

Related U.S. Application Data (60) Provisional application No. 61/986,217, filed on Apr. 30, 2014.

(51) Int. Cl.
| | |
|---|---|
| *H04B 10/071* | (2013.01) |
| *H04B 10/25* | (2013.01) |
| *H04B 10/079* | (2013.01) |
| *G01V 1/22* | (2006.01) |

(52) U.S. Cl.
CPC ............ *H04B 10/25* (2013.01); *G01V 1/226* (2013.01); *H04B 10/0795* (2013.01)

(58) Field of Classification Search
CPC .......................... H04B 10/071; H04B 10/0795
See application file for complete search history.

(56) References Cited

U.S. PATENT DOCUMENTS

| | | | |
|---|---|---|---|
| 2004/0098198 A1* | 5/2004 | McGirr | G01V 1/008 |
| | | | 702/2 |
| 2007/0280050 A1 | 12/2007 | Volterrani | |
| 2010/0128348 A1* | 5/2010 | Taverner | G01J 3/1895 |
| | | | 359/572 |
| 2012/0081999 A1 | 4/2012 | Halliday et al. | |
| 2012/0092960 A1 | 4/2012 | Gaston et al. | |
| 2014/0025319 A1* | 1/2014 | Farhadiroushan | G01S 5/186 |
| | | | 702/56 |
| 2014/0036628 A1 | 2/2014 | Hill et al. | |
| 2014/0152995 A1* | 6/2014 | Dong | G01D 5/35316 |
| | | | 356/477 |

(Continued)

OTHER PUBLICATIONS

International Search Report and Written Opinion for PCT Application No. PCT/US2015/022425, dated Jun. 29, 2015, pp. 1-12.

*Primary Examiner* — Shi K Li
(74) *Attorney, Agent, or Firm* — Cantor Colburn LLP (57) ABSTRACT

A distributed acoustic sensing system and a method of obtaining acoustic levels using the distributed acoustic sensing system are described. The distributed acoustic sensing system includes an optical fiber, a light source to inject light into the optical fiber, and a photodetector to sample a DAS signal in each section of one or more sections of the optical fiber resulting from two or more points within the section on the optical fiber over a period of time. The system also includes a processor to process only a low frequency portion of the DAS signal to obtain the acoustic levels at each of the one or more sections on the optical fiber over the period of time, the low frequency portion of the DAS signal being less than 10 Hz.

18 Claims, 5 Drawing Sheets

(56) References Cited

U.S. PATENT DOCUMENTS

2014/0198617 A1* 7/2014 Noui-Mehidi .......... E21B 47/04
                                                        367/81
2016/0123798 A1* 5/2016 Godfrey ............. G01D 5/35361
                                                        73/643

* cited by examiner

DISTRIBUTED ACOUSTIC SENSING USING LOW PULSE REPETITION RATES

CROSS-REFERENCE TO RELATED APPLICATION

This application is a Non-Provisional of U.S. Provisional Patent Application Ser. No. 61/986,217 filed Apr. 30, 2014, the disclosure of which is disclosure of which is incorporated by reference herein in its entirety.

BACKGROUND

Distributed acoustic sensing (DAS) systems use optical fiber as a sensing element. In general, a light source introduces light in the optical fiber, and resulting reflected or scattered light is detected to obtain the acoustic information. Different types of scattered light result when the light is transmitted in the optical fiber. For example, the photons may be elastically scattered in a phenomenon known as Rayleigh scattering. Raman and Brillouin scatter are types of inelastic scatter that also result and are distinguished from Rayleigh scatter and from each other based on their frequency shift. When one or more reflectors (e.g., fiber Bragg gratings (FBGs)) are arranged at one or more portions of the optical fiber, the transmitted light is reflected at a wavelength that is affected by the reflector. The reflected or scattered light may be used to determine parameters such as temperature, strain, and acoustics along the optical fiber.

SUMMARY

According to an embodiment, a distributed acoustic sensing system to obtain acoustic levels includes an optical fiber; a light source configured to inject light into the optical fiber; a photodetector configured to sample a DAS signal in each section of one or more sections of the optical fiber resulting from two or more points within the section on the optical fiber over a period of time; and a processor configured to process only a low frequency portion of the DAS signal to obtain the acoustic levels at each of the one or more sections on the optical fiber over the period of time, the low frequency portion of the DAS signal being less than 10 Hz According to another embodiment, a method of obtaining acoustic levels using a distributed acoustic sensing system includes disposing an optical fiber in an area in which the acoustic levels are to be determined; injecting light into the optical fiber with a light source; sampling, using a photodetector, a DAS signal at each section of one or more sections of the optical fiber originating from two or more points within the section of the optical fiber over a period of time; and processing, using a processor, only a low frequency portion of the DAS signal, the processing including obtaining the acoustic levels at each of the one or more sections of the optical fiber over the period of time, the low frequency portion of the DAS signal being less than 10 Hz.

BRIEF DESCRIPTION OF THE DRAWINGS

Referring now to the drawings wherein like elements are numbered alike in the several Figures.

DETAILED DESCRIPTION

As noted above, a distributed acoustic sensing (DAS) system may be used to obtain acoustic information and other information in a given environment. An exemplary application is a downhole exploration or production effort. Typically, the DAS signal (return based on transmitting light into the optical fiber) includes a low frequency component that is largely due to temperature changes and a high frequency component due to acoustic sources. Embodiments of the systems and methods described herein relate to processing the low frequency component to obtain acoustic levels. According to the embodiments, low pulse repetition rates may be used such that overall data volume may be reduced.

Figure 1:
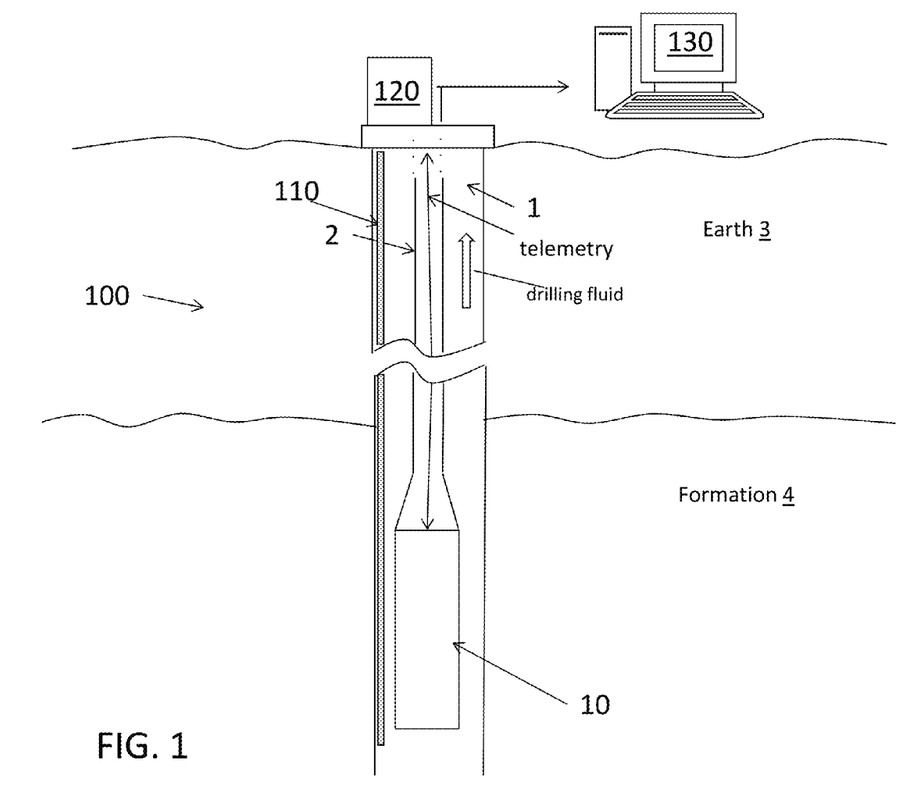
FIG. 1 is a cross-sectional illustration of a borehole and a distributed acoustic sensing (DAS) system according to embodiments of the invention.

FIG. 1 is a cross-sectional illustration of a borehole 1 and a distributed acoustic sensing (DAS) system 100 according to embodiments of the invention. The arrangement shown in FIG. 1 is one exemplary use of the DAS system 100. While the DAS system 100 may be used in other environments and in other sub-surface arrangements, the exemplary DAS system 100 shown in FIG. 1 is arranged to measure acoustic levels in a borehole 1 penetrating the earth 3 including a formation 4. A set of tools 10 may be lowered into the borehole 1 by a string 2. In embodiments of the invention, the string 2 may be a casing string, production string, an armored wireline, a slickline, coiled tubing, or a work string. In measure-while-drilling (MWD) embodiments, the string 2 may be a drill string, and a drill would be included below the tools 10. Information from the sensors and measurement devices included in the set of tools 10 may be sent to the surface for processing by the surface processing system 130 via a fiber link or telemetry. The surface processing system 130 (e.g., computing device) includes one or more processors and one or more memory devices in addition to an input interface and an output device. The DAS system 100 includes an optical fiber 110 (the device under test, DUT). Embodiments of the optical fiber 110 are further detailed below. The DAS system 100 also includes a surface interrogation unit 120, further discussed with reference to FIG. 2.

Figure 2:
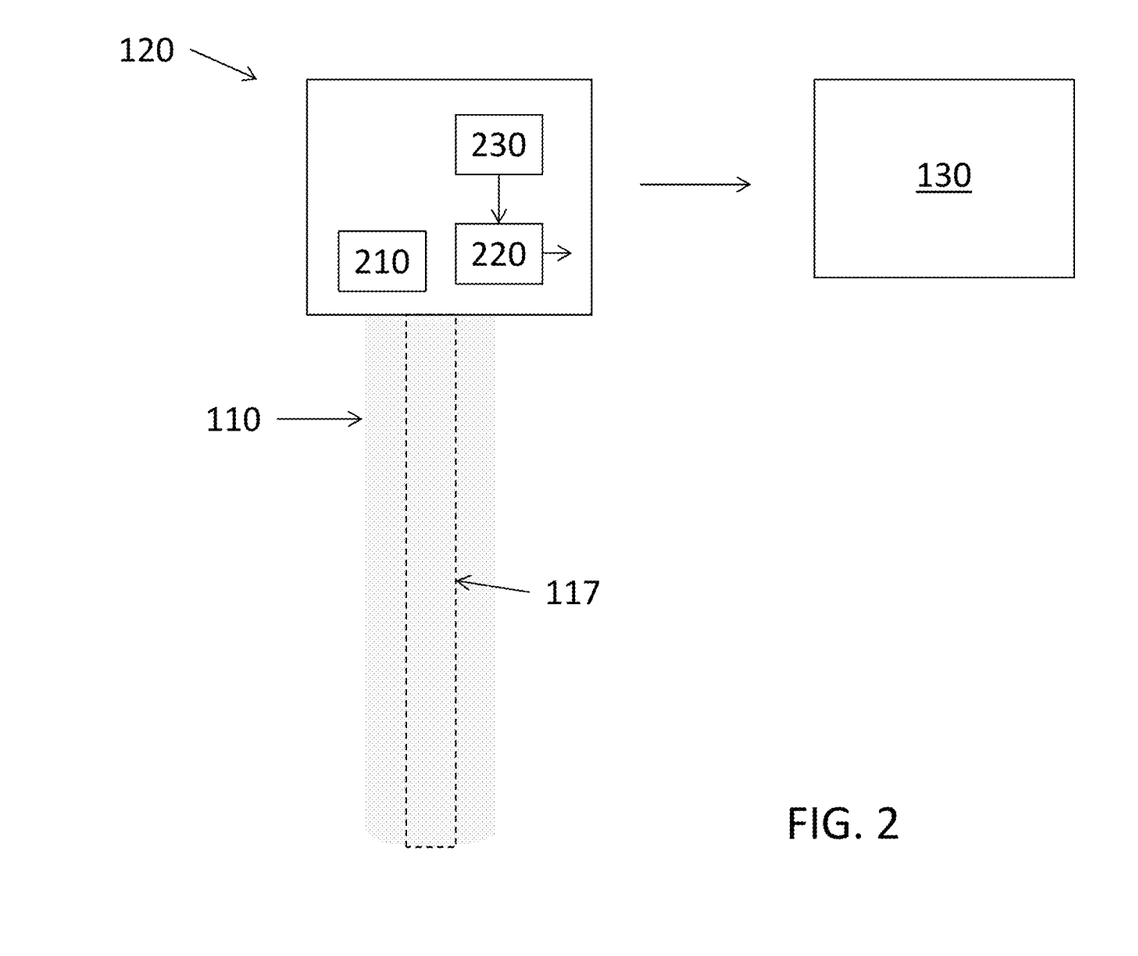
FIG. 2 details the DAS system shown in FIG. 1 according to one embodiment of the invention.

FIG. 2 details the DAS system 100 shown in FIG. 1 according to one embodiment of the invention. The DAS system 100 includes an interrogation unit 120, a light source 210, and one or more photodetectors 220 to receive the reflected signals or scatter from the optical fiber 110. The interrogation unit 120 may be disposed at the surface in the exemplary embodiment shown in FIG. 1. The interrogation unit 120 may additionally include a processing system 230 with one or more processors and memory devices to process the scatter resulting from illuminating the optical fiber 110 with a fiber core 117. Alternately, the photodetectors 220 may output the reflection information to the surface processing system 130 for processing. The interrogation unit 120 typically includes additional elements such as a circulator (not shown) to direct light from the light source 210 into the optical fiber 110 and scatter or reflection generated in the optical fiber 110 to the one or more photodetectors 220. The light source may be a coherent light source in which light waves are in phase with one another. According to one embodiment, the light source 210 may be a laser and may emit pulses of light at the same wavelength and amplitude. According to an alternate embodiment, the light source 210 may be a swept-wavelength laser and may emit pulses of light having a range of wavelengths. The photodetector 220 detects a DAS signal resulting from the incident light pulses being emitted into the optical fiber 110. According to an embodiment of the invention, the DAS signal is a measure of interference among the Rayleigh scatter originating from multiple nearby points in the optical fiber 110 over time (a number of samples of interference signals from a particular length of the optical fiber 110). According to another embodiment, the DAS signal is a measure of interference among reflections resulting from fiber Bragg gratings (FBGs) within the optical fiber 110. The DAS signal is processed to determine the acoustic information as detailed below.

The processing of the DAS signal to obtain acoustic information is based on a recognition that the amplitude of the low frequency DAS signal (used to determine temperature) may be used to map acoustic intensity. The low frequency DAS signal generally refers to the portion or component of the DAS signal that is less than 10 Hertz (Hz). The frequency of this low frequency component decreases as pulse width of the light pulse transmitted by the light source 210 decreases. The DAS signal may be modeled as a Fabry-Perot interferometer and is given by:

$$DAS = \text{Re}\left(A * \exp\left[i\left(\frac{4\pi L}{\lambda}\right)\left(n_0 + \frac{dn}{dT}\Delta T(t)\right)(1 + \varepsilon(t))\right]\right) \quad [\text{EQ. 1}]$$

EQ. 1 shows the DAS signal at a given instant of time t. A is the amplitude of the measured intensity of the interference of Rayleigh scatter, for example, measured by the photodetector 220. L is the pulse length of the light pulse emitted by the light source 210 (e.g., laser), $\lambda$ is the wavelength of the light emitted by the light source 210 at the given instant of time t. Over a period of time, the value of $\lambda$ may be constant according to one embodiment or may vary over a range of wavelengths (may sweep a range of wavelengths) according to another embodiment. $n_0$ is the refractive index of the optical fiber 110. dn/dT is the change in the refractive index with temperature and is approximately 1e-5 per degree Celsius (° C.$^{-1}$). $\Delta T(t)$ is the time dependent change in temperature, and $\varepsilon(t)$ is the time dependent strain. This time dependent strain component provides the acoustic information. The DAS system 100 only measures the real component of the DAS signal, but the ideal signal produced in the optical fiber 110 (e.g., by Rayleigh scatter) is a complex number. The imaginary portion of the DAS signal may be approximated using a Hilbert transform of the photodetector 220 measured data as:

DAS'=DAS+i*Hilbert(DAS)  [EQ. 2]

The amplitude (modulus) of the transformed complex signal (DAS') is a constant value represented by B:

|DAS'|=|A|=B  [EQ. 3]

Noting that the low frequency DAS fringes due to temperature changes have an amplitude related to the acoustic signal levels that are present, the DAS signal may be regarded as having a temperature component, Temp, and an acoustic component, Acoust. Then EQ. 3 may be written as:

|DAS'|=|Temp*Acoust|=|Temp|*|Acoust|=B  [EQ. 4]

Thus, the acoustic levels in the area of the optical fiber 110 may be determined based on the amplitude of the temperature induced signals (e.g., Rayleigh scatter).

When the wavelength $\lambda$ is changing over time based on the embodiment that uses a swept-wavelength laser, for example, EQ. 1 may be used to derive EQ. 4 and obtain acoustic levels regardless of whether temperature is constant or changing over time. However, when the wavelength is constant based on the embodiment that uses a constant wavelength light source 210, if the temperature is constant ($\Delta T(t)$=0), then the DAS signal does not include a low frequency component due to temperature effects, and EQ. 4 cannot be used to easily obtain the acoustic levels. When EQ. 4 is used to obtain the acoustic levels (because temperature is not constant or because a swept-wavelength light source 210 is used) instead of using high frequency components, as is currently done, then relatively much lower data acquisition rates may be used, and acoustic monitoring is facilitated over relatively much longer distances. As an example, a typical DAS data sampling rate may be 5 kilo Hertz (kHz) while the DAS system 100 according to embodiments discussed herein may acquire the DAS signal (e.g., Rayleigh scatter) at 50 Hz, thereby facilitating the storage and processing of a much lower volume of data. In addition, the typical DAS data sampling rate would suffer from the effects of aliasing if low data acquisition rates were used to monitor acoustics over long distances. However, the DAS system 100 described herein facilitates monitoring acoustic levels over long distances. This is because, when using the DAS system 100 to monitor broadband flow noise in the borehole 1, for example, the low frequency monitoring described above should be relatively insensitive to aliasing.

Figure 3:
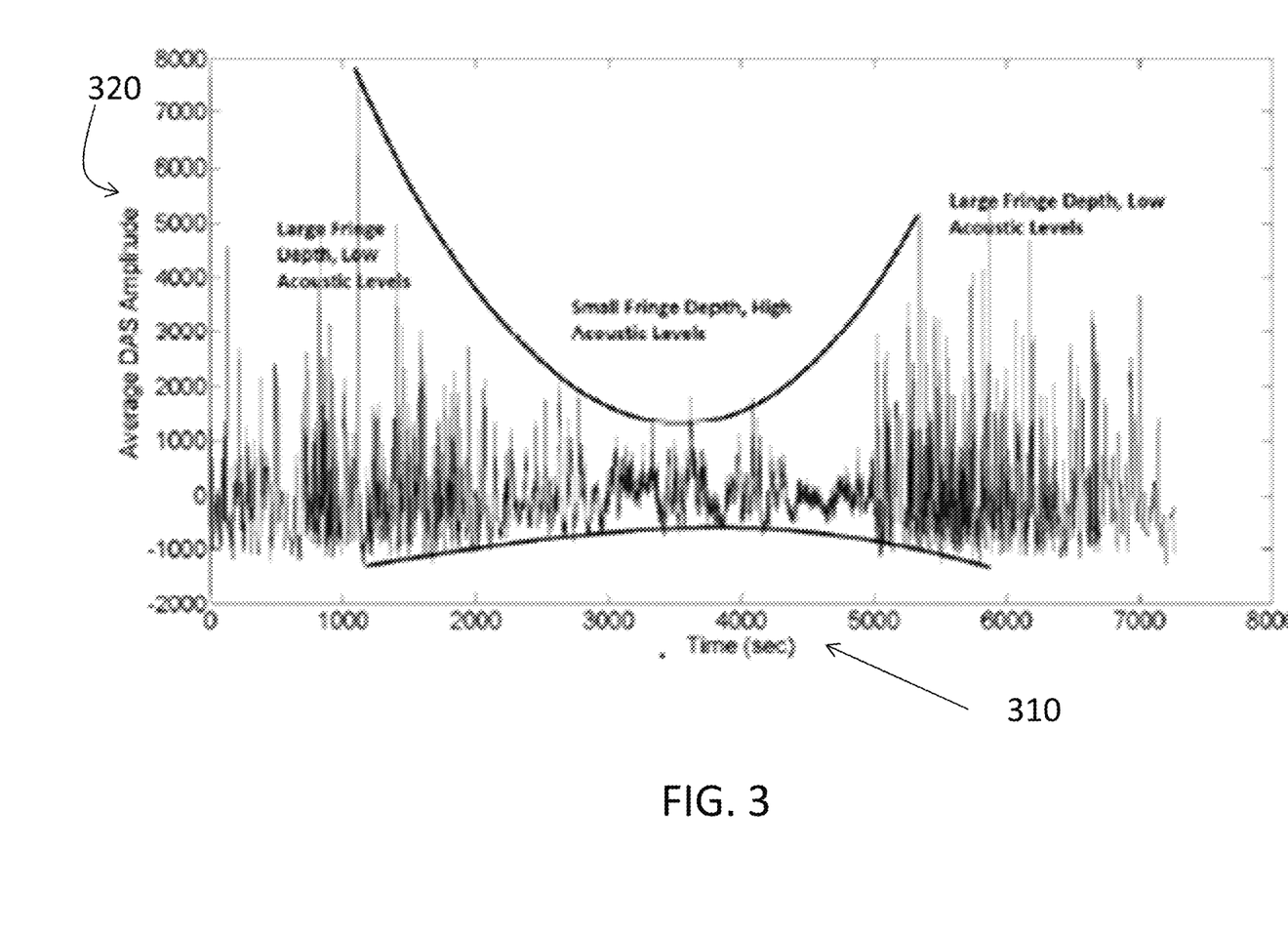
FIG. 3 illustrates an exemplary amplitude plot that indicates acoustic levels according to embodiments of the invention.

FIG. 3 illustrates an exemplary amplitude plot that indicates acoustic levels according to embodiments of the invention. In FIG. 3, time is shown along the axis 310, and average DAS amplitude, the time-averaged amplitude of the interference of Rayleigh scatter signals resulting from two or more points in a length of the optical fiber 110, is shown along the axis 320. High acoustic levels are indicated by relatively smaller fringe depth and low acoustic levels are indicated by relatively larger fringe depth, as shown. That is, EQ. 1 involves non-linear frequency mixing between low frequency temperature induced signals and higher frequency acoustic signals. As the acoustic levels increase in amplitude, the level of mixing increases such that the low frequency signals get mixed up to higher frequencies. For example, if the DAS system 100 is measuring an acoustic signal at 100 Hz and a temperature change is causing a low frequency component at 1 Hz, at low acoustic amplitudes, the DAS system 100 will measure the 1 Hz and the 100 Hz components at their correct frequencies. As the acoustic signal amplitude increases, frequency mixing occurs, resulting in sum and difference frequencies (99 Hz and 101 Hz) in addition to the true signals at 1 Hz and 100 Hz. Above a certain amplitude for the acoustic signal, the signals at 1 Hz and 100 Hz are completed converted into the sum and difference frequencies (99 Hz and 101 Hz), and the low frequency (1 Hz) is no longer measured. This depletion of low frequency signals facilitates the low frequency signals becoming sensitive to the level of the high frequency acoustic signals. The Rayleigh backscatter originating from the multiple proximate points on the optical fiber 110 is oscillatory as a function of time. The depth of the oscillations is inversely proportional to the acoustic strain applied to the optical fiber 110, as illustrated in FIG. 4.

Figure 4:
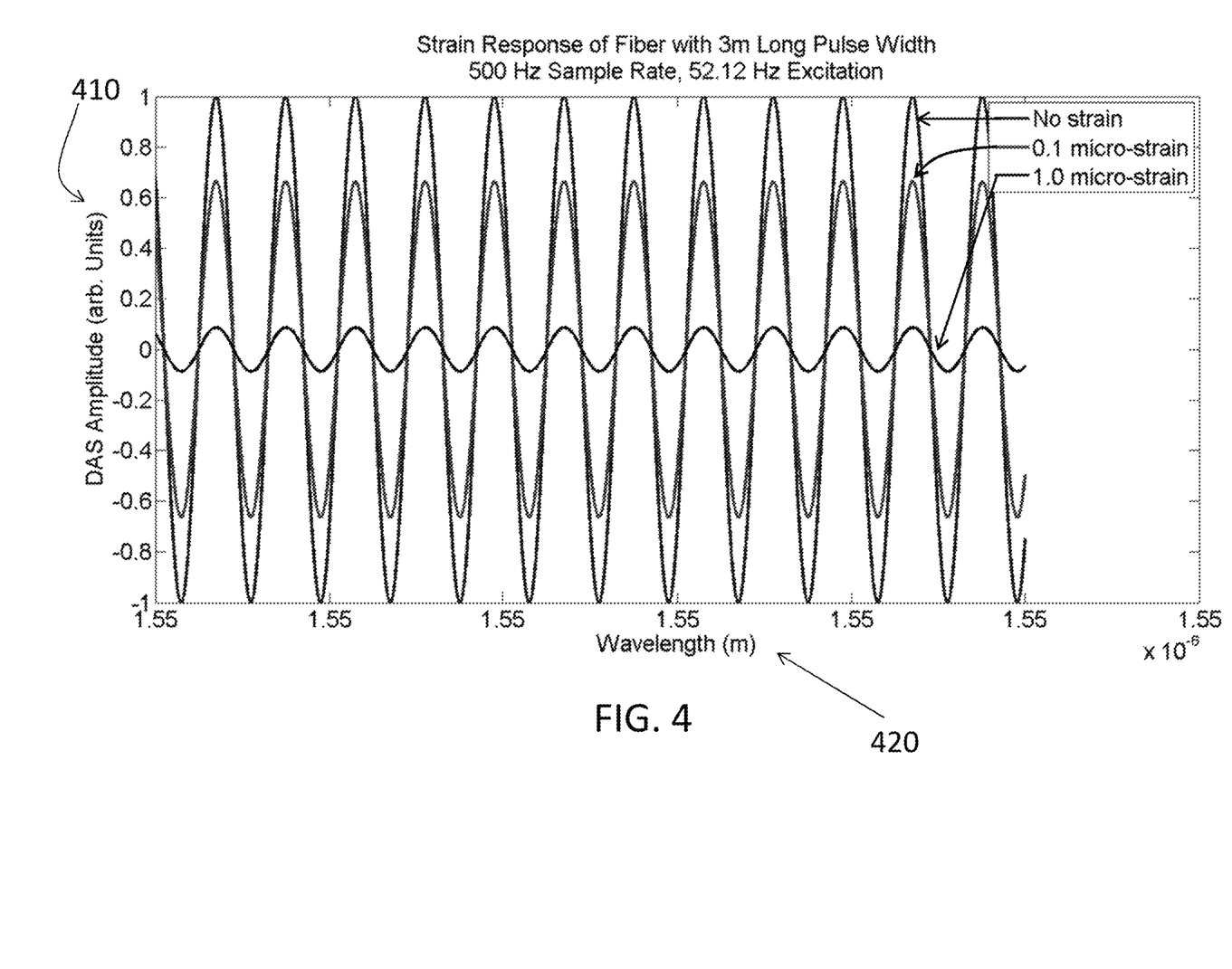
FIG. 4 illustrates an exemplary amplitude plot that indicates strain, which is proportional to acoustic levels, according to an embodiment of the invention.

FIG. 4 illustrates an exemplary amplitude plot that indicates strain, which is proportional to acoustic levels, according to an embodiment of the invention. The DAS amplitude, indicated on the axis 410, is obtained for a variable wavelength, indicated on the axis 420, that is swept (varied over a range of values). The DAS signal is obtained with a 500 Hz sample rate, and the acoustic strain is a sine wave of 52.12 Hz. As FIG. 4 illustrates, as the strain increases, the DAS amplitude decreases. The strain, which affects the DAS amplitude, is an indicator of the acoustic level at the point along the optical fiber 110 at which the DAS signal (interference of Rayleigh scatter) originated. In the case of using a light source 210 with a swept wavelength, the frequency of the DAS signal is controlled through the wavelength sweep rate. Thus, recovery of the low frequency component of the DAS signal may not be necessary because the DAS signal may be a low frequency signal. In that case, the acoustic amplitude is recovered through the fringe depth related to the entire DAS signal. The processing described above with reference to a length (of proximate points) on the optical fiber 110 may be repeated at different areas or sections (interference signals from different sections along the optical fiber 110 may be measured) such that acoustic levels at different periodic or random intervals along the optical fiber 110 may be monitored.

Figure 5:
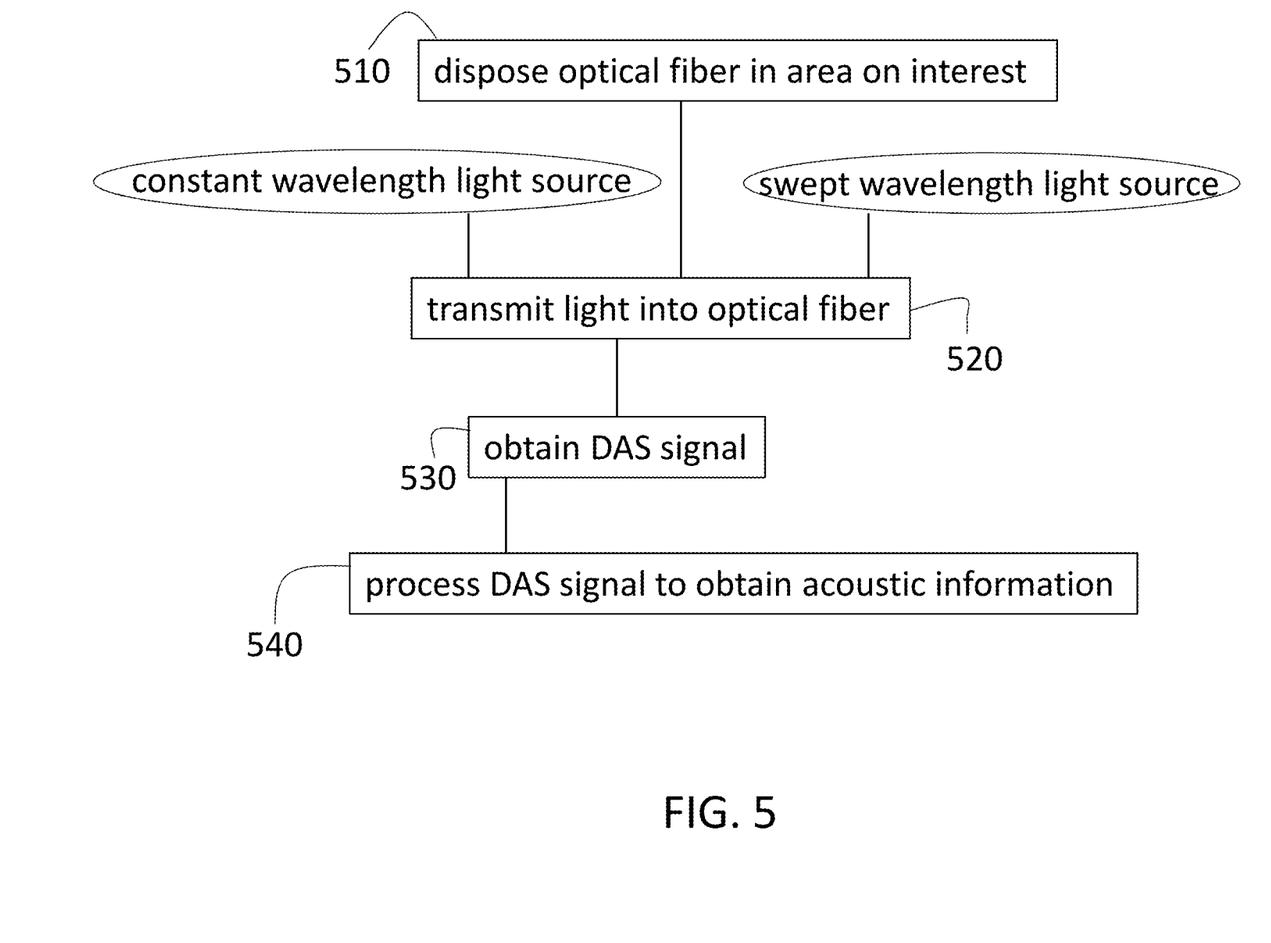
FIG. 5 is a process flow of a method of determining acoustic level using the DAS system according to embodiments of the invention.

FIG. 5 is a process flow of a method of determining acoustic level using the DAS system 100 according to embodiments of the invention. At block 510, disposing the optical fiber 110 in the area of interest includes disposing the optical fiber 110 in a borehole 1 or another area in which acoustic levels are to be measured and monitored. At block 520, transmitting light into the optical fiber 110 includes using a constant wavelength light source 210 or a swept wavelength light source 210. When the temperature is constant, the swept wavelength light source 210 must be used to obtain acoustic levels according to EQ. 4. While the embodiment detailed herein for interrogating the optical fiber 110 with the light source 210 to generate the DAS signal relates to optical time domain reflectometry (OTDR), optical frequency domain reflectometry (OFDR) may be used in alternate embodiments. Once the DAS signal is obtained, the processing described herein to obtain the acoustic levels applies to both embodiments. At block 530, obtaining the DAS signal includes one or more photodetectors 220 measuring interference of Rayleigh backscatter or reflections originating at two or more points within a given length along the optical fiber 110 based on the incident light transmitted into the optical fiber 110. At block 540, processing the DAS signal to obtain acoustic information (in the given area) includes using EQ. 4 to determine acoustic levels based on amplitude as shown in exemplary FIGS. 3 and 4. As noted above, when the DAS signal is obtained in more than one area of the optical fiber 110, the acoustic levels at the multiple areas of the optical fiber 110 may be determined and monitored.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A distributed acoustic sensing system to obtain acoustic levels, comprising:
   an optical fiber;
   a light source configured to inject light into the optical fiber;
   a photodetector configured to sample a DAS signal in each section of one or more sections of the optical fiber resulting from two or more points within the section on the optical fiber over a period of time, wherein a sampling rate of less than or equal to 500 Hertz (Hz) is used to sample the DAS signal; and
   a processor configured to process only a low frequency portion of the DAS signal to obtain the acoustic levels at each of the one or more sections on the optical fiber over the period of time, the low frequency portion of the DAS signal being less than 10 Hz, wherein the processor determines the acoustic levels at each of the one or more areas based on:

|DAS'|=|Temp*Acoust|=|Temp|*|Acoust|=B, where DAS' is the Hilbert transform of the DAS signal, Temp is a temperature component of the DAS signal, Acoust is an acoustic component of the DAS signal, and B is a constant.

2. The system according to claim 1, wherein the light source emits light pulses at a constant wavelength.

3. The system according to claim 2, wherein the light source emits the light pulses at the constant wavelength when temperature varies over time at the two or more points of the one or more sections of the optical fiber.

4. The system according to claim 1, wherein the light source emits pulses of light that sweep a range of wavelengths.

5. The system according to claim 1, wherein the photodetector samples the DAS signal at each section of the one or more sections of the optical fiber by measuring interference between an intensity of Rayleigh backscatter originating at the two or more points within the section of the optical fiber.

6. The system according to claim 1, wherein the photodetector samples the DAS signal at each section of the one or more sections of the optical fiber by measuring interference between an intensity of reflections originating at the two or more points within the section of the optical fiber.

7. The system according to claim 1, wherein the DAS signal at each of the one or more areas resulting from the two or more points is given by:

$$DAS = \text{Re}\left(A * \exp\left[i\left(\frac{4\pi L}{\lambda}\right)\left(n_0 + \frac{dn}{dT}\Delta T(t)\right)(1 + \varepsilon(t))\right]\right),$$

where A is amplitude of the DAS signal, L is a pulse length of a light pulse emitted by the light source, $\lambda$ is the wavelength of the light emitted by the light source, $n_0$ is a refractive index of the optical fiber, dn/dT is approximately 1e-5 per degree Celsius, $\Delta T(t)$ is a time dependent change in temperature, and $\varepsilon(t)$ is a time dependent strain, which represents the acoustic levels.

8. The system according to claim 1, wherein the optical fiber is disposed in a borehole, and the processor determines the acoustic levels at one or more sections along the optical fiber corresponding with one or more positions in the borehole.

9. The system according to claim 1, wherein the sampling rate of less than or equal to 150 Hz is used to sample the DAS signal.

10. A method of obtaining acoustic levels using a distributed acoustic sensing system, the method comprising:
    disposing an optical fiber in an area in which the acoustic levels are to be determined;
    injecting light into the optical fiber with a light source;

sampling, using a photodetector, a DAS signal at each section of one or more sections of the optical fiber originating from two or more points within the section of the optical fiber over a period of time, wherein the sampling is at a sampling rate of less than or equal to 500 Hertz (Hz); and processing, using a processor, only a low frequency portion of the DAS signal, the processing including obtaining the acoustic levels at each of the one or more sections of the optical fiber over the period of time, the low frequency portion of the DAS signal being less than 10 Hz, wherein the processor obtaining the acoustic levels at each of the one or more sections is based on:

|DAS'|=|Temp*Acoust|=|Temp|*|Acoust|=constant, where DAS' is the Hilbert transform of the DAS signal, Temp is a temperature component of the DAS signal, and Acoust is an acoustic component of the DAS signal.

11. The method according to claim 10, wherein the injecting the light includes emitting light pulses at a constant wavelength.

12. The method according to claim 11, wherein the emitting the light pulses at the constant wavelength is done when temperature values vary over time at the two or more points of the one or more sections of the optical fiber.

13. The method according to claim 10, wherein the injecting the light includes emitting pulses of light that sweep a range of wavelengths.

14. The method according to claim 10, wherein the photodetector sampling the DAS signal at each section of the one or more sections includes the photodetector measuring interference of an intensity of Rayleigh backscatter originating at the two or more points within the section of the optical fiber.

15. The method according to claim 10, wherein the protodetector sampling the DAS signal at each section of the one or more sections includes the photodetector measuring interference of an intensity of reflections originating at the two or more points within the section of the optical fiber.

16. The method according to claim 10, wherein the photodetector sampling the DAS signal includes the photodetector sampling a signal given by:

$$DAS = \text{Re}\left(A * \exp\left[i\left(\frac{4\pi L}{\lambda}\right)\left(n_0 + \frac{dn}{dT}\Delta T(t)\right)(1 + \varepsilon(t))\right]\right),$$

where A is amplitude of the DAS signal in one of the one or more sections, L is a pulse length of a light pulse emitted by the light source, $\lambda$ is the wavelength of the light emitted by the light source, $n_0$ is a refractive index of the optical fiber, $dn/dT$ is approximately 1e-5 per degrees Celsius, $\Delta T(t)$ is a time dependent change in temperature, and $\varepsilon(t)$ is a time dependent strain, which represents the acoustic levels.

17. The method according to claim 10, wherein the disposing the optical fiber includes disposing the optical fiber in a borehole, and the processor obtaining the acoustic levels is at the one or more sections along the optical fiber corresponding with one or more positions in the borehole.

18. The method according to claim 10, wherein the sampling is at the sampling rate of less than or equal to 150 Hz.

* * * * *